United States Patent [19]
Roberts

[11] Patent Number: 5,259,304
[45] Date of Patent: Nov. 9, 1993

[54] CAROUSEL COMPACTOR FOR MULTI-COMPONENT REFUSE

[76] Inventor: Mark A. Roberts, 1917 Woodcrest Dr., Duncan, Okla. 73533

[21] Appl. No.: 937,169

[22] Filed: Aug. 31, 1992

[51] Int. Cl.5 .................. B30B 15/00; B30B 15/02
[52] U.S. Cl. .................................. 100/99; 53/527; 100/215; 100/218; 100/223; 100/290; 141/80; 141/83; 141/265
[58] Field of Search .............. 100/99, 215, 218, 221, 100/223, 240, 246, 290; 53/527; 141/73, 80, 83, 265

[56] References Cited

U.S. PATENT DOCUMENTS

| | | | |
|---|---|---|---|
| 286,168 | 10/1883 | Badgley | 141/265 |
| 628,663 | 7/1899 | Hysore | 100/99 |
| 2,395,898 | 3/1946 | Mohr | 141/73 X |
| 2,984,957 | 5/1961 | Lundgren . | |
| 3,531,909 | 10/1970 | Edebalk . | |
| 3,540,495 | 11/1970 | Lundgren . | |
| 3,808,967 | 5/1974 | Fair et al. . | |
| 4,188,877 | 2/1980 | Khan | 100/290 |
| 4,241,652 | 12/1980 | Smedlund | 100/223 X |
| 4,526,095 | 7/1985 | Rewitzer | 100/99 X |
| 4,620,479 | 11/1986 | Diamond et al. . | |
| 4,996,918 | 3/1991 | Carter et al. . | |
| 4,997,102 | 3/1991 | Bolling . | |
| 5,031,829 | 7/1991 | Shantzis . | |
| 5,123,341 | 6/1992 | Carter et al. | 100/223 |
| 5,129,318 | 7/1992 | Zimmer | 100/221 X |

FOREIGN PATENT DOCUMENTS 6605687 10/1967 Netherlands .............. 100/223

Primary Examiner—Stephen F. Gerrity
Attorney, Agent, or Firm—Dougherty, Hessin, Beavers & Gilbert

[57] ABSTRACT

A carousel trash compactor for selectively sorting and recycling multi-component refuse. The carousel includes a turntable mounted in the lower portion of the housing and supporting refuse bins rotatable with the turntable to position a selected bin in a refuse receiving position or a refuse compaction position. In the housing upper portion, a stationary compactor mechanism is positioned for compacting refuse in a bin therebeneath. A lid closes an opening in the top of the housing over the refuse-receiving position. A receptacle retrieving subassembly mounted in the upper portion of the housing facilitates removal of a full receptacle from the housing. Automatic control devices are provided for selectively rotating the turntable and bins, for weighing each bin, for compacting the refuse and for extricating the filled bins from the housing.

21 Claims, 4 Drawing Sheets

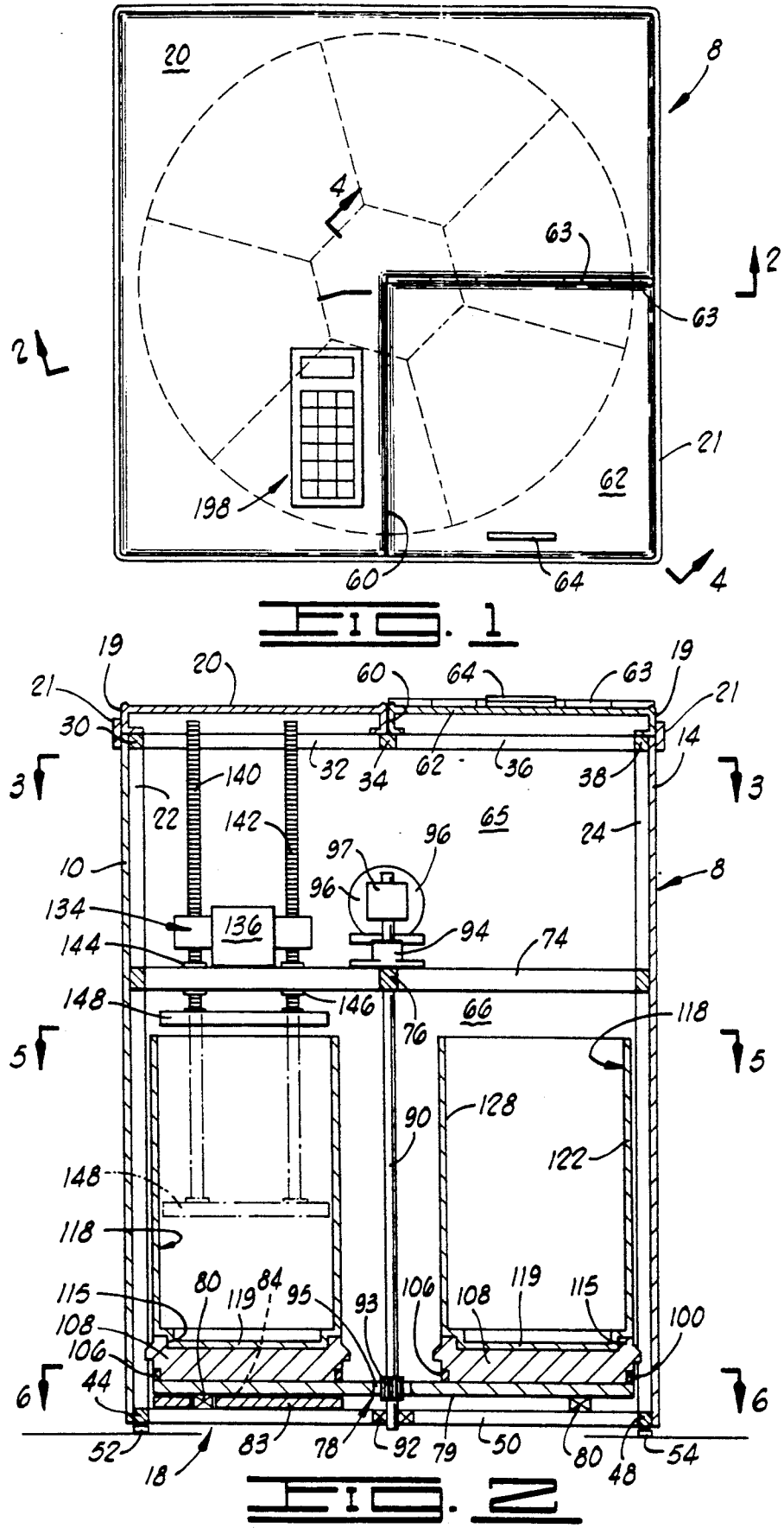

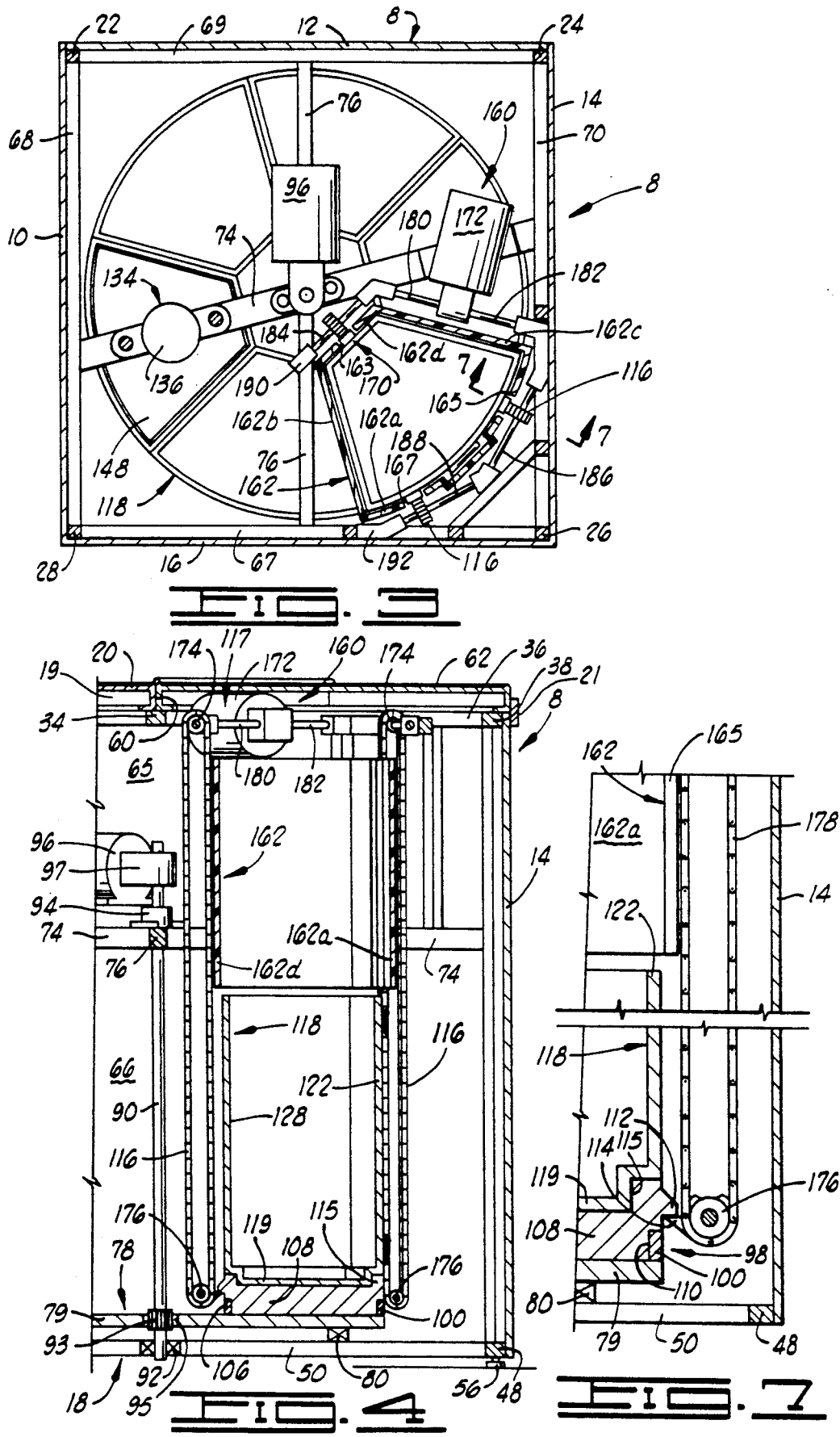

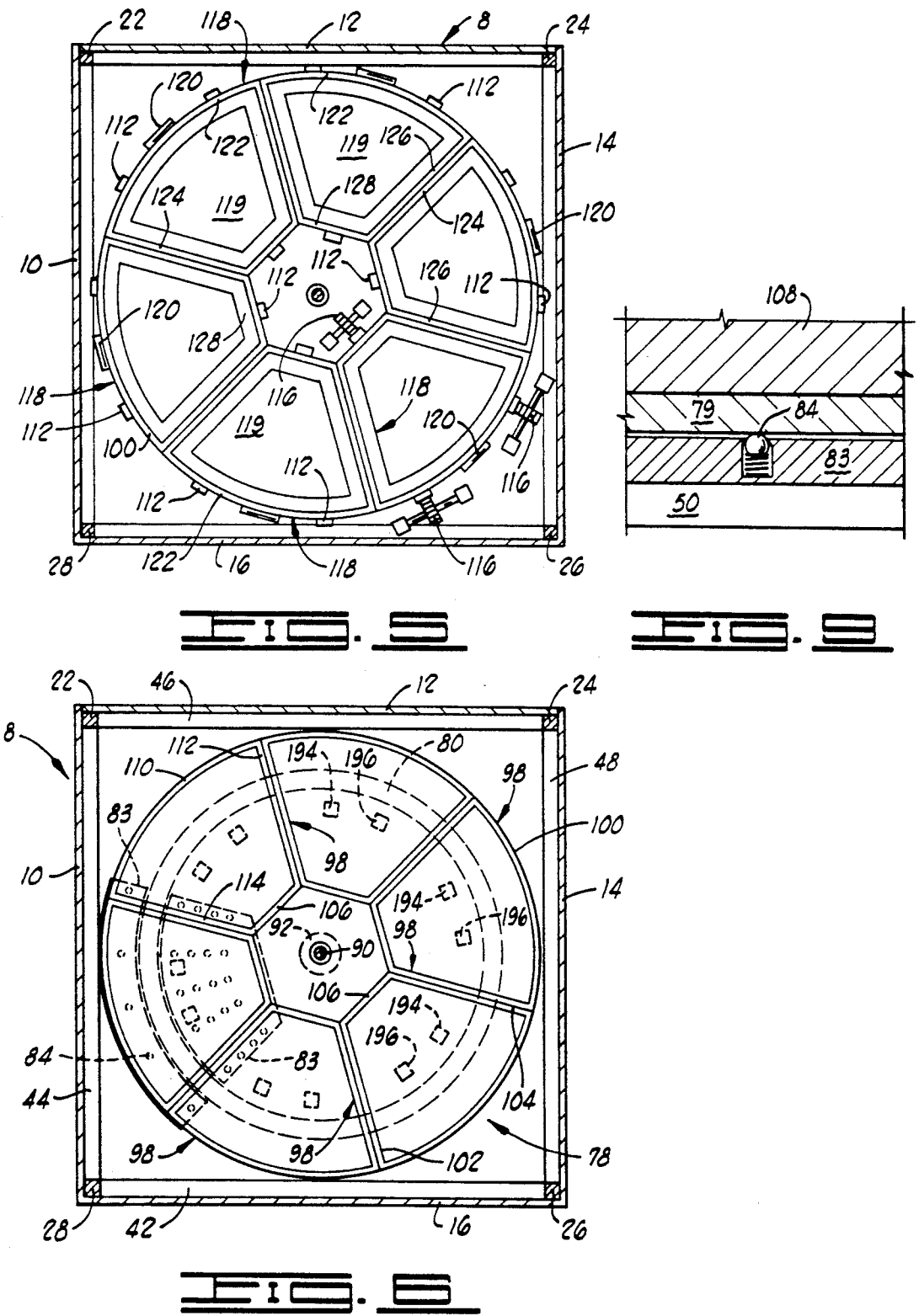

CAROUSEL COMPACTOR FOR MULTI-COMPONENT REFUSE

FIELD OF THE INVENTION

This invention relates to a system which enables multi-component refuse to be automatically selectively sorted into multiple movable receptacles. The system is particularly, though not exclusively, adapted for use in a home kitchen environment.

BACKGROUND OF THE INVENTION

Description of the Problem

There currently exists a rapidly intensifying problem which entails the ecologically acceptable disposition of household trash and refuse. An important desideratum is that, to the extent that the components of the refuse are reusable, recycling of such components facilitating such reuse be accomplished. Even where a particular category of household refuse might be satisfactory from an ecological disposal standpoint as a landfill material, economic considerations, as well as basic conservation principles, often dictate that it be recycled, reprocessed and made into useful goods, the provision of which will eliminate the need for new consumption leading to depletion of additional natural resources.

Many communities are already practicing limited recycling as a result of landfill closures, or to avoid air or water pollution resulting from methods of disposition acceptable in the past, but which are now understood to pose a variety of problems. With increasing frequency, legislation is being enacted which mandates the commencement of certain types of recycling programs. In the near future such recycling requirements are likely to involve household refuse and trash generated in the course of normal living, and such businesses as fast-food chains, restaurants and the like will also be impacted by this trend.

It is anticipated that there will be a reluctance by individuals to take the time and make the effort needed to sort household refuse and trash into various recyclable categories, yet such will be necessary because heterogeneous household refuse does not readily lend itself to any one recycling procedure or process, or the easy automatic reclamation of any specific products therefrom. Thus, laws requiring such sorting and the toleration of such inconvenience may be necessary in order to provide the necessary impetus to widespread selective sorting and recycling of refuse by household members and small businesses.

On the other hand, if a system can be provided relatively economically for installation and use in the average American household, and such system facilitates home segregation of refuse to permit recycling to be easily effected, it is believed that most persons will be disposed to voluntarily install and use such systems.

In the ordinary course of living, most households produce several recyclable products, including paper goods, aluminum cans, plastic articles, glass and various metals. Often, however, these particular items are heterogeneously mixed and require manual sorting or "picking" in order to permit them to be homogeneously accumulated in containers suitable for moving to a recycling site.

Brief Description Of The Prior Art

Various types of trash compacting devices have been previously proposed, and in some of these multiple bins are sequentially moved between refuse compacting and refuse receiving positions. U.S. Pat. No. 3,531,909 discloses a turntable which supports a plurality of trash receptacles. Each receptacle is passed successively under a loading chute, and then under a compacting station where the trash contained in the bin is compressed by a reciprocating ram. Each filled bin is ultimately removed from the turntable at a removal station.

U.S. Pat. No. 2,984,957 to Lundgren discloses a rotating turntable or stage which is used to successively move multiple lined containers (one after the other) under the mouth of a chute through which rubbish or refuse is dropped into the respective lined container. This assembly also employs periodic compression of the refuse at a compression station.

In U.S. Pat. No. 3,540,495, a garbage feed chute feeds garbage into one of a plurality of receptacles arranged in contiguous relation around the periphery of a rotatable platform. After the garbage is deposited in a particular receptacle, it is subjected to compaction, using a compacting assembly.

An apartment house refuse recycling and disposal system is shown in U.S. Pat. No. 5,031,829. In this system, multiple cans or receptacles are carried on a rotatable platform and are selectively positioned beneath a garbage chute which extends down from several floors of the apartment. A microprocessor is utilized to permit the tenants to select the particular receptacle which is to receive the refuse which they have already manually separated according to recycling categories. A ramp by which full receptacles can be removed from this assembly is provided at one side of the turntable in order to take off the receptacles after they have been filled.

Other patents which disclose various types of refuse-compacting systems involving multiple receptacles which are moved from station-to-station for compaction and receipt of refuse include U.S. Pat. No. 4,997,102, U.S. Pat. No. 4,996,918, U.S. Pat. No. 4,620,479 and U.S. Pat. No. 3,808,967.

BRIEF DESCRIPTION OF THE PRESENT INVENTION

The present invention provides a carousel or turntable-type of multiple category trash compacting, weighing and receptacle removal system. The trash compacting system of the invention is particularly adapted for utilization in a household kitchen where the cook or preparer of the food has frequent occasion to encounter a variety of types of homogeneously blended household refuse. If the person who is the custodian of this refuse will take a few moments to separate it into various recyclable categories and deposit them in selected ones of the multiple bins or containers used in the system of the present invention, a great deal of time can be saved, refuse can be compacted and stored in discrete recyclable categories and the system can be operated substantially continuously.

Broadly described, the carousel trash compactor of the invention includes a turntable or rotating stage upon which a plurality of trash-receiving bins or receptacles are mounted in contiguous relation to each other and in circular array about a central axis of rotation. The bins, and the rotating base plate or stage upon which they are mounted, are located within a housing and the drive motor for driving the base plate in rotation is located in the upper portion of the housing. A motor is also positioned in the upper portion of the housing for driving a compacting ram into a bin or receptacle located therebelow after the turntable has been selectively rotated to bring a selected bin into a compacting position. Load cells are provided beneath the bins so that their weight can be continuously monitored. Other systems for determining the extent to which a receptacle has been filled, either by weight or volume, such as the distance of extension of the compacting ram into the bin, the opposing force build-up vis-a-vis the material contained within a bin or receptacle, can also be used for determining the time when a bin or receptacle should be removed from the system for unloading. When a bin or receptacle has become sufficiently loaded, it can be extricated from the housing by a suitable lift subassembly which lifts the bin upwardly to the top of the housing and permits it to be removed from the system and replaced by an empty bin.

By means of the present invention, it is easily possible for a cook, housewife or other person dealing with mixed refuse to sort the refuse into recyclable categories such as paper, glass and plastic, to sequentially load receptacles with these segregated categories of refuse, to compact the refuse placed in such receptacles, to automatically continuously weigh these receptacles so that the extent to which they are filled can be determined, and finally, to automatically lift and extricate these receptacles from the system by moving the receptacles up through an opening at the top of the housing in which the system is located.

An important object of the invention is to provide an easily operated refuse segregating, compacting, weighing and removal system which can dispose of heterogenous refuse in a way which permits much of the refuse to be segregated, compactly stored and recycled.

A further object of the invention is to provide a method by which municipal refuse can be segregated into multiple categories as end usages may dictate, then weighed, then disposed of in bins which are taken to a disposal site.

Additional objects and advantages of the invention will become apparent as the following detailed description of the invention is read in conjunction with the accompany drawings which illustrate a preferred embodiment of the invention.

BRIEF DESCRIPTION OF THE DRAWINGS

FIG. 1 is a top plan view of the carousel compactor for multi-component refuse constructed in accordance with the present invention. The general location of the several refuse receiving bins or receptacles in the lower portion of the housing of the apparatus is illustrated by dashed lines.

FIG. 2 is a sectional view taken along line 2—2 of FIG. 1.

FIG. 3 is a sectional view taken along line 3—3 of FIG. 2.

FIG. 4 is a sectional view taken along line 4—4 of FIG. 1.

FIG. 5 is a sectional view taken along line 5—5 of FIG. 2.

FIG. 6 is a sectional view taken along line 6—6 of FIG. 2.

FIG. 7 is a sectional view taken along line 7—7 of FIG. 3.

FIG. 9 is a sectional view taken through a compacting force plate and spring biased bearing element constituting structures used in the invention.

DETAILED DESCRIPTION OF A PREFERRED EMBODIMENT OF THE INVENTION

Figure 8:
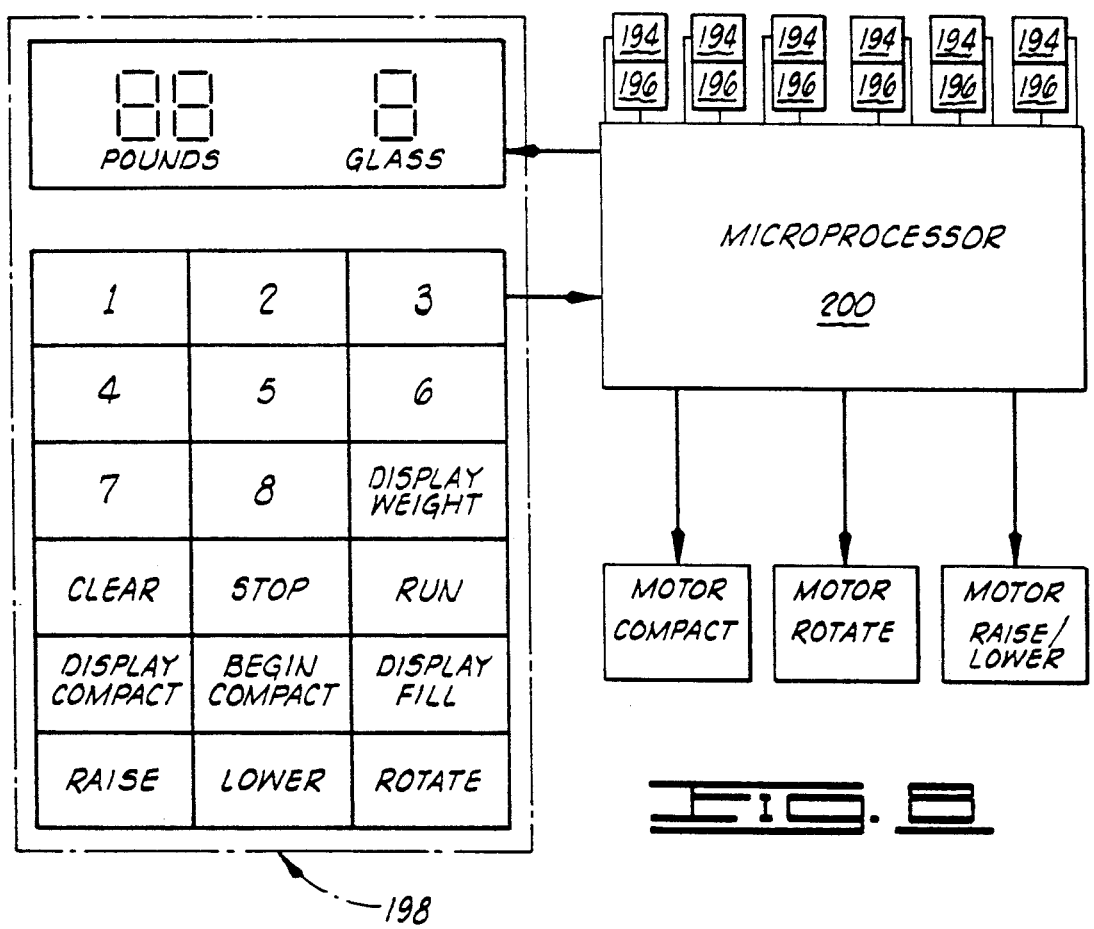
FIG. 8 is a schematic illustration of a control panel and control circuitry used in the semi-automatic operation of the system.

The carousel compactor for multi-component refuse of the invention includes, in the illustrated embodiment, an upstanding housing 8 which is of right parallelepiped configuration. The housing 8 could alternatively be constructed in cylindrical or polygonal shape, and it may be used in a free standing form, or it can be incorporated beneath a cabinet in the kitchen of a residence. The housing 8 includes four vertically extending side walls 10, 12, 14 and 16, a bottom frame 18 and a top wall 20. The top wall 20 is generally made removable, as a whole, from the side walls 10, 12, 14 and 16 of the housing 8. The hollow interior of the housing 8, and the various mechanisms contained therein, and to be hereinafter described, can thus be made accessible from above for inspection, repair or replacement operations, if such should be needed.

It will also be noted in referring to FIG. 2 that the top wall 20 is upset or positioned vertically above the side walls 10, 12, 14 and 16 of the housing 8. In addition to a peripheral upsetting flange 19, which extends around the periphery of the top wall and projects downwardly therefrom, the cover carries a small, overhanging, flashing skirt 21 which assures that any spillage or run-off that may fall on the top of the carousal compactor will be deflected from running into the housing. Moreover, the entire compactor system can be set into a kitchen cabinet in a way such that there is a vertical upset of the top wall 20 above the top of the counter which assures that there is less tendency for any spillage to run down around the appliance into the interior of the counter.

The side walls 10-16 are secured to an internal frame which includes vertically extending corner posts 22, 24, 26 and 28 and horizontally extending interconnecting top frame members 30, 32, 34, 36, 38 and 40. The bottom frame 18 of the housing is made up of a plurality of interconnected, horizontally extending bottom frame members 42, 44, 46 and 48. The bottom frame members 44 and 48 are interconnected by a large central transverse frame member 50. The housing 8 is supported at its four corners by four stationary, vertically adjustable foot plates 52, 54, 56 and 58. It may occasionally be desirable to replace these foot plates with casters or rollers.

A rectangular opening 60 is formed in one corner of the top wall 20 and is closed by a hinged rectangular lid 62. The lid 62 is pivotally supported on a suitable hinge 63 and can be pivoted upwardly to an open position by means of a handle or hand grip 64. Limited access to the interior of the housing 8 is gained by opening the lid 62, and this structure also facilitates removal of refuse filled bags, bins or containers from the housing as hereinafter explained.

The housing 8 can be considered as divided into an upper portion and a lower portion as represented in the drawings by the upper space 65 and the lower space 66 (see FIG. 2). These spaces are delineated or separated from each other by coplanar, interconnected perimeter frame members 67, 68, 69 and 70. These are interconnected by a substantially horizontally extending first central motor support beam 74 and a horizontally extending second central motor support beam 76. The positions of the first and second central motor support beams 74 and 76 can be best understood by reference to FIGS. 2 and 3 of the drawings.

In the lowermost portion of the housing 8, a turntable or carousel subassembly, designated generally by reference numeral 78, is mounted in a horizontal position spaced upwardly slightly from the frame members which make up the bottom sub-frame 18 as shown in FIG. 3, 4 and 7. The turntable or carousel sub-assembly 78 includes a flat, disk-shaped base plate 79 which is rotatably supported on an annular bearing race 80. Additional support is provided by a compacting force plate 83 which carries a plurality of spring-supported ball bearing elements 84 (see FIGS. 2, 6 and 9) which are spring biased upwardly to contact the lower side of the rotatable base plate 79. The compacting force plate 83 is a generally pie-shaped plate of the general configuration shown in dashed lines in FIG. 6. The described construction permits the base plate 79, forming a part of the carousel subassembly 78 to rotate freely in a horizontal plane, yet be adequately supported by the bearing race 80 and the compacting force plate 83.

For the purpose of driving the base plate 79 of the carousel subassembly 78 in rotation, a vertically extending drive shaft 90 extends downwardly within the housing 8 in a position coincident with the central axis of the housing. Its lower end is journalled in a suitable bearing socket 92. The bearing socket 92 is mounted in, and supported by, the transverse frame member 50. At a location where the drive shaft 90 passes through a central opening in the base plate 79, the drive shaft carries a pinion gear 93 which drivingly engages a ring gear 95 mounted to the base plate around the central opening therethrough.

The upper end of the drive shaft 90 passes through the central motor support beam 76 and enters the open sided journal element 94 (see FIGS. 2 and 4). At its upper end, the drive shaft 90, carries a suitable gear (not shown) located within a gear box 97 which permits it to be driven in rotation by the output shaft (not shown) from a suitable motor 96. To this end, the output shaft from the motor 96 carries a bevel gear (not shown) which drivingly engages a bevel gear carried on the upper end of the drive shaft 90, and mounted within the gear box 97.

The carousel assembly base plate 79 carries a plurality of container or bin guide frames 98 for containers or bins. The guide frames 98 are identically shaped, and their configurations can best be perceived by reference to FIGS. 2 and 6. Certain bin lift plates, hereinafter described, have been removed in FIG. 6 in order to more clearly illustrate the bin guide frames 98. It will be noted that each guide frame 98 includes an arcuate radially outer rib 100 which has its opposite ends connected by a pair of radially extending ribs 102 and 104 to a radially inner rib 106. This construction is best illustrated in FIGS. 2, 4 and 6.

Each of the bin guide frames 98 defines a receptacle into which a complementary shaped bin lift plate 108 can be set. The bin lift plates 108 correspond in number to the number of bin guide frames 98, and each has a peripheral groove or recess 110 cut around its outer periphery so that it can be inserted into the mating bin guide frame 98 in the manner illustrated in FIGS. 2, 4, 6 and 7. Each of the bin lift plates 108 also carries three outwardly protuberant lifting lugs 112 spaced from each other around the respective lift plate for engagement by lifting fingers 114 carried on three endless chain drive elements 116 forming a part of a bin lifting subassembly 117 hereinafter described.

The three endless chain drive elements 116 are spaced from each other and are positioned for lifting a respective one of the bin lift plates 108 and a filled bin supported thereon in a manner best illustrated in FIGS. 3, 4, 5 and 7. At its upper side, each of the bin lift plates 108 defines an internal recess 115 or cavity of generally cylindrical configuration which is complementary in configuration to a protuberant downwardly projecting, generally cylindrical bottom section 119 formed on the lower end of each one of a plurality of refuse-receiving, open-topped bins 118. The complementary interfit of the protuberant base or bottom section 119 of each of the open-topped bins 118 with the internal receiving recess or cavity 115 formed in the upper side of each of the bin lift plates 108 is such that each bin can be manually lifted up and out of its respective supporting bin lift plate. This is effected at one time during operation of the system by means of a handle 120 formed on the outer arcuate peripheral side of each of the bins 118.

The inset at the cylindrical bottom portion 119 of each of the bins 118 also facilitates stacking or nesting of the bins when they are stored away from the compactor when they are not in use. In other words, the open top of each bin fits around the projecting or protuberant base or bottom section 119, and several of the bins can be safely stacked in a vertical array because of this offset at this location near the bottom of each bin.

Each of the bins 118 is generally pie-shaped in cross-sectional configuration, and has a radially outer arcuate side formed as a segment of a cylinder and denominated by reference numeral 122. Each bin also has a pair of straight radial sides 124 and 126, and a radially inner side 128. In the illustrated embodiment of the invention, there are six of the bin lift plates 108 arrayed contiguously around the outer peripheral edge of the base plate 79 and supported thereon in the guide frames 98. In like manner, there are six of the vertically extending open-topped bins 118 supported on the six bin lift plates in the manner best illustrated in FIGS. 2, 4 and 7. More or fewer of the lift plates 108 and bins 118 can be provided in other embodiments of the invention if desired.

Other means for raising one of the bins or receptacles can be used rather than the chain drive elements included in the illustrated bin-lifting subassembly. Thus, a screw-type lifting system can be used in which one or more screws are incrementally moved through a threaded supporting structure to cause elevation and lowering of the bins. It is also possible to use a hydraulic jack system beneath each bin to push the bin upwardly to an unloading position.

In summary, the bin lift plates 108 can be lifted up and elevated within the housing 8 by means of a bin lifting subassembly 117 to be hereinafter described. When the bin 118 reaches the top of the housing, the respective bin can then be lifted up out of the respective bin lift plate 108. Removal of the bin out of the refuse compacting apparatus of the invention for transport to a point of disposition of the bins, or at least, the refuse that is carried therein, is thus facilitated. Alternatively flexible bags may be carried in rigid bins and used to contain the refuse, and these bags can then be removed from the elevated bins.

It will be apparent from the description of the invention thus far that when the carousel subassembly 78 is rotated, the base plate 79 forming a part thereof is also rotated. Such rotation is effected by the driven rotation of the shaft 90. The several bins 118 carried in the bin lifting plates 108 are concurrently rotated to selected positions underneath the stationary top portion of the housing 8. The extent to which the carousel subassembly is rotated at an time is selectively determined by a person operating the system. Each bin 118 is, at a desired time selectively rotated into a compaction position, or into a fill position, or into a retrieving or emptying position, all as more particularly hereinafter described.

It will also be noted that the height of the several refuse-receiving bins 118 is such that as they are rotated, they are well below the central frame elements or motor supporting beams 74 and 76 and thus are free to rotate without interference by these structural members which are interconnected to, and form a part of, the housing 8.

A refuse compacting subassembly 134 is mounted within the housing 8 and is best illustrated in FIGS. 2 and 3. The refuse compacting subassembly 134 includes a drive motor 136 secure)y and stably mounted on the upper side of the cross frame member or motor supporting beam 74. The drive motor 136 has a pair of output shafts (not shown) which drivingly engage, through worm gears or bevel gears, a pair of horizontally spaced, vertically extending threaded shafts 140 and 142. The drive motor 136 is a reversible motor. As the motor 136 is driven in one direction, the shafts 140 and 142 are caused to move downwardly through suitable sleeves 144 and 146 forming journal openings through the central frame member or beam 74. When the motor 136 is reversed, the shafts 140 and 142 are reciprocated upwardly.

The threaded vertically extending shafts 140 and 142 are secured at their lower end to a refuse compacting plate 148. The refuse compacting plate 148 has a peripheral configuration which is generally complementary to the peripheral configuration of each of identically shaped bins 118. The compacting plate 148 can thus be advanced downwardly to the dashed line position illustrated in FIG. 2, and thus function to compact or compress trash or refuse within the bin into which it moves. It will be noted, as FIG. 2 is perused, that the bin 118, into which the compacting plate 148 is being forced downwardly by the threaded shafts 140 and 142 as the motor 136 is energized, is positioned above, and in vertical alignment with, the compacting force plate 83.

When the reversible motor 136 is reversed, the compacting plate 148 will be retracted upwardly from the dashed line position shown in FIG. 2 to the full line position shown in that Figure, thus permitting the bin 118 then below the refuse-compacting subassembly 134 to be rotated freely to another position within the housing in which it is no longer beneath the refuse-compacting subassembly 134.

At the time that the refuse-compacting subassembly 134 is o energized and the compacting plate 148 is moved downwardly into a bin 118 therebelow to compact refuse in that bin, the bin, its respective bin lift plate 108 and the base plate 79 which supports that bin lift plate are forced downwardly against spring biased ball bearings 84 which project upwardly from the upper side of the compacting force plate 83. These bearings are at this time forced downwardly, and the full force of the compaction is then withstood by the unyielding stationary compacting force plate 83 located below the bin 118 undergoing compacting. When compacting of the refuse in the bin 118 has been completed, and the compacting plate 148 has been withdrawn upwardly, the spring biased ball bearings 84 carried in the upper surface of the force plate 83 can again move upwardly under the bias of their respective springs (see FIG. 9). They can now establish bearing contact with the lower side of the base plate 79, and function together with the annular bearing race 80 to permit the base plate to rotate freely within the housing 8.

A refuse loading and bin unloading subassembly 160 is provided in the system, and is mounted within the housing 8. It is best illustrated in FIGS. 3, 4, 5 and 7 of the drawings. The refuse filling and bin unloading subassembly 160 includes a guide chute 162. It will be noted in referring to FIG. 3, that the cross-sectional configuration of the chute 162 is complementary to the cross-sectional configuration of each of the bins 118—that is, it is generally pie-shaped in cross-sectional configuration. The guide chute 162 is a four-part structure forming a four walled chute having slots in two of the walls or sides thereof as best illustrated in FIG. 3. The four sides of the chute 162 are denominated by reference numerals 162a, 162b, 162c and 162d. The sides 162a and 162d, being the radially outer and radially inner sides of the guide chute 162, are slotted as shown in FIG. 3 to accommodate the lifting mechanism which is used in a manner hereinafter described. One of these slots is illustrated in FIG. 7 of the drawings. Thus, a vertical slot 163 is formed in the side wall 162d, and two horizontally spaced, vertically extending slots 165 and 167 are formed in the side wall 162a. The refuse and guide chute 162 is retained in the illustrated position by attachment to stationary frame elements (not visible) provided within the housing 8 and secured to the sides 162a and 162d of the chute.

Each of the three endless chains 116 in the bin lift subassembly 117 carries a bin lifting finger 114 as previously explained (and see FIGS. 4 and 7). Each of the chains 116 passes over, and is engaged by, a driven sprocket 174 and an idler sprocket 176 stationarily mounted within the housing. The lifting finger 114 which projects inwardly from each chain 116 is of a length, and is located in a position, such that the respective lifting finger will, as it begins its upward movement with the respective chain 116, become engaged with one of the radially protuberant lifting lugs 112 which project outwardly from the outer periphery of each of the bin lift plates 108 at three different spaced locations therearound, as hereinbefore explained. The described engagement of one of the lifting fingers 114 with one of the radially protuberant lugs 112 the instant that lifting of one of the bins 118 is commenced is illustrated in FIG. 7 of the drawings.

Each driven sprocket 174 is driven at the same rate as, and in synchronism with, the other two driven sprockets by means of a drive linkage which interconnects an output shaft (not shown) from a drive motor 172 with each of the driven sprockets (see FIGS. 3 and 4). The drive linkage includes shafts 180 and 182. These two shafts, through universal joint connections, or similarly functioning interconnecting elements, drive the shafts 184 and 186 to which two of the driven sprockets 174 are keyed as shown in FIG. 3. The third driven sprocket 174 is driven in rotation by a shaft 188 which is drivingly connected through a suitable flexible joint or coupling to the shaft 186. The free ends of the shafts 184 and 188 are supported in suitable journals 190 and 192, respectively.

The motor 172, which is supported by suitable bracing and structure within the housing 8 at the location shown in FIGS. 3 and 4, is a reversible motor. The motor 172 is driven in one direction in order to lift a filled bin 118 upwardly into and through the guide chute 162 in order to allow the bin to be removed from the housing 8 when the hinged lid 62 is raised. Reversal of the motor 172 causes a new, empty bin 118 to be lowered back down into the housing. Suitable limit switches (not shown) are provided to prevent the motor from overdriving in either direction. The guide chute 162 functions at other times, when the compactor apparatus is not in the bin lifting and discharge mode, to channel or direct refuse or trash downwardly into one of the bins 118 located therebelow at a time when the lid 62 is pivoted upwardly on its hinge 63 by means of a handle 64 to provide open access to the guide chute 162.

Located below the center of the lower side of each of the bin lifting plates 108 in the rotary plate 79 are a pair of recesses which function to accommodate a pair of load cells or weight transducers, denominated by reference numerals 194 and 196. The locations of these load cells are shown in dashed lines in FIG. 6 of the drawings. The load cells 194 and 196 protrude upwardly under the several bin lift plates 108, so that the weight of the bin within each of the respective bin lifting plates 108 is transferred to the two load cells therebelow. These in turn generate electrical signals indicative of the weight of the bin thereabove, and these signals are transmitted via electrical leads (not shown) which pass through the hollow interior of the shaft 90 to the outside of the housing.

The electrical leads are connected to a suitable instrument control panel, such as the control panel 198 shown mounted on the upper side or top 20 of the housing in FIGS. 1 and 8. In other embodiments, the control panel 198 may be mounted at other locations on the housing 8. This top mounted location, however, enables an operator of the system to be constantly apprised of the weight of the refuse which has been collected in any one of the six bins at any time, as this weight is continuously monitored and determined by the two load cells 194 and 196 mounted under the respective bin lifting plate 108 into which the respective bin is fitted.

An automatic control system which can be used in operating the carousel compactor system of the invention is illustrated in FIG. 8. The automatic control system illustrated includes the operator-accessible control panel 198. While this particular panel as shown in FIG. 8 of the drawings is set up to weigh and control the movements of as many as eight different bins, the particular embodiment of the invention shown in FIGS. 1-7 contemplates a six bin arrangement. For purposes of description, the use and performance of the control panel 198 can be described with reference to its controlling function and regardless of the number of utilized bins which it controls in any particular embodiment of the invention.

Signals from the control panel 198 are directed to a microprocessor 200, and this in turn is connected to, and receives signals from, the load cells 194 and 196 under each of the bins as hereinbefore described. The microprocessor also is connected to, and controls the operation of, the compacting motor 136, the carousel rotating motor 96 and the bin elevating and lowering motor 172, all as depicted in FIGS. 3 and 8. For example, it may be assumed that the No. 6 bin in the array of six bins 118 is being utilized for collecting paper. Assuming that a load of paper has just been sorted from kitchen trash and garbage, it is then inserted through the open top 20 when the lid 62 is open to permit this paper to gravitate through the chute 162 into the designated No. 6 bin for paper. Following the introduction of the paper into the No. 6 bin via the opening in the top 20 of the housing 8 via the refuse guide chute 162, the lid 62 of the housing is then re-closed. This lid closure will remove a safety interlock relay from an electric circuit so that the carousel can be rotated by selective energization of the carousel rotating motor 96.

Following the closure of the lid 62, the operator will then depress the "display compact" button on the control panel 198, will next depress the "rotate" button, and will finally depress the "6" button. The effect of these manipulations will be to cause the base plate 79 of the carousel assembly 78 to be driven in rotation. It will continue to be rotated by the microprocessor 200 until it is caused to stop so that bin No. 6 is in the display-compact position underneath the compactor subassembly 134 which is mounted in the upper portion of the housing 8. The compactor subassembly 134 includes the compacting plate 148 (see FIG. 2). When the "begin compact" button is pressed, the compacting plate 148 will be reciprocated downwardly to compact the paper in bin No. 6 which has been brought by the automatic control into a display-compact position immediately below the compactor mechanism. This downward motion of the compacting plate 148 cannot be commenced, however, until the "display compact" button is illuminated, or the display reads "begin compact".

The descendency of the plate 148 into the No. 6 bin 118 will continue until the resistance to further downward movement is sensed by a suitable sensing device which then stops the motor 136 after the resistance reaches a certain predetermined magnitude. An appropriate signal is then displayed apprising the operator that a certain magnitude of loading by compaction has been achieved in bin No. 6, and that because of this, further downward movement of the compacting plate 148 has been terminated. This termination will usually be by automatic cutoff or interruption of power to the motor 136. At this time, the ram will automatically retract to a location well above the bin 118 into which it has previously been extended in accomplishing its compacting function. When a bin reaches the predetermined "full" status, the display will automatically flash "full" on the control panel.

The operator may now choose to enter a further function control command into the control panel 198 to be delivered to the three motors and the control elements via the microprocessor 200. He may at this time desire to rotate the No. 6 bin 118 in which the paper has been compacted to a position where that bin can be extricated from the housing and transported to another location for disposition. This will generally be a decision reached after a check of the "display weight" readout on the control panel indicates there is an adequate amount of paper contained in the No. 6 bin to call for it to be removed and emptied, or that the display provides an indication that the bin is "full" following compaction.

In such a case, the "display fill" button is depressed, the "rotate" button on the control panel is depressed and the "6" button is depressed. This sequence will cause the rotary base plate to rotate until the No. 6 bin is brought to a position where it can either receive more paper or be removed from the housing 8. This will be indicated by illumination of the "display fill" readout. At this time, the "raise" button is depressed, and this causes the lifting motor 172 to be energized. This in turn causes the endless chains 116 to be driven so that the No. 6 bin 118 is lifted upwardly in the housing 8 as previously described.

Other types of lifting mechanisms ca be used for effecting the upward movement of the bin in question, and some other mechanisms have been previously described herein simply by way of providing examples of other systems which can be employed. In whichever system is used for elevating the filled bin, it is desirable to provide appropriate electrical circuitry or mechanical interlocks to be assured that the bin which is about to be elevated is accurately aligned under the chute. This will allow the "lift" motor to activate the lift mechanism so as to avoid jamming or breakage problems resulting from this misalignment. In many cases, it will also be desirable for the lid to be open before the "raise" command from the microprocessor can be carried out. In other words, adequate assurance is preferably provided (although such mechanism is not here shown in detail), in order to avoid problems resulting from misalignment of the bin in each of the various positions which a bin will assume during the operation of the system.

The No. 6 bin is lifted above the bin fill chute 162 and the bin projects upwardly through the opening formed in the top 20 of the housing when the lid 62 is lifted upwardly. It is automatically stopped at this elevation by a limit switch (not shown). The filled No. 6 bin can then be removed from the housing 8, and its contents removed to an ultimate disposal location. After the filled bin has been removed and has been replaced by a new empty bin (or, as previously indicated, by a flexible bag or the like), the bin lift plate 108 carrying the empty bin is lowered by depressing the "lower" button on the control panel.

As illustrated in FIG. 8, the control panel 198 also provides other buttons which perform valuable functions in the operation of the system. Thus, the "clear" button provided on the control panel will clear any functions which have been entered in error, and which the operator desires to, in effect, erase. In other words, any function which has been started by mistake, with the result that an undesirable operational phase is entered, can be cleared.

An interruption, without clearance, of such function can be quickly accomplished simply by depressing the "stop" button. This temporarily interrupts any function and prevents it from being completed. Thus, if a jam should start to occur, before the system has become irreparably damaged, the "stop" button can be depressed to obviate further intensification of the jamming.

Finally, in the illustrated embodiment of the invention with a control panel 198 of the type shown in FIG. 8, pressing the "run" button will simply counteract the "stop" button and will resume carrying out the last function for which a command has been entered via the control panel.

Other types of control functions developed through a remote control panel can be effected, and are within the knowledge of those skilled in the electrical and electronics art.

From the foregoing description of the invention, it will be perceived that the carousel compactor system of the invention provides a highly useful arrangement for segregating heterogeneous refuse into its various component parts, containing these parts or categories of refuse and compacting them while so contained and preparatory to disposition. The system can be semi-automatically operated by remote control, and is well adapted for incorporation in a kitchen setting where household refuse can be sorted, segregated, contained, compacted and removed from the household to appropriate recycling facilities.

Although a preferred embodiment of the invention has been herein described as reference is made to the drawings which illustrate a preferred embodiment of the invention, it will be understood that various changes and innovations in the structure of the illustrated system can be effected without departure from the basic principles upon which the invention is based. Some of these alternative arrangements in construction, such that various lifting mechanisms which might be used, instead of the chain drive elements shown in the drawings, have been hereinbefore alluded to, and many of them will be susceptible to accomplishment by those skilled in the art without further detailing. Changes and innovations of that type are therefore deemed to be circumscribed by the spirit and scope of the invention, except as the same may be limited by the appended claims, or reasonable equivalents thereof when the claims are given a broad interpretation.

What is claimed is:

1. A carousel-type refuse compacting system comprising:
    a rotary base plate extending in a substantially horizontal plane, and mounted for rotation about a vertical axis;
    a plurality of contiguous refuse receiving bins removably mounted on said base plate, and rotatable therewith about said vertical axis;
    means for selectively and incrementally driving said base plate in increments of rotation to bring said bins to certain preselected positions;
    a stationary supporting structure;
    a refuse compacting subassembly mounted on said stationary supporting structure at a location spaced vertically above said rotatable base plate in a position to compact refuse in one of the bins carried on said base plate;
    chute means for directing refuse to the selected bin, which chute means is at another location on said stationary supporting structure over said base plate and horizontally spaced from said refuse compacting subassembly;
    means for detecting and indicating the amount of refuse in selected bins; and
    a filled bin elevating and extricating subassembly mounted adjacent said chute means and over said base plate on said stationary supporting structure for elevating and extricating a filled bin from its position on said rotary base plate.

2. A carousel-type refuse compacting system as defined in claim 1 wherein said means for selectively and incrementally driving said rotary base plate comprises:
    a rotary base plate motor mounted on said stationary support structure above said rotary base plate; and
    a vertical shaft drivingly connected to said base plate, and connected to said rotary base plate motor for driven rotation by said rotary base plate motor; and
    means for selectively starting and stopping said motor to selectively and incrementally drive said base plate.

3. A carousel-type refuse compacting system as defined in claim 1 wherein said stationary supporting structure comprises:
   a housing having a top portion and a bottom portion, and further including side walls and a top wall having an opening therethrough;
   a hinged lid closing the opening in the top wall.

4. A carousel-type refuse compacting system as defined in claim 3 wherein said filled bin elevating and extricating subassembly comprises:
   a reversible bin lifting motor supported by said stationary supporting structure at a location above said rotary base plate;
   a plurality of horizontally spaced, vertically extending endless chains drivingly connected to said bin motor for bidirectional movement during the raising and lowering of a filled bin as said motor is drivingly actuated for rotation in first one direction and then another;
   a lift finger carried on each of said endless chains, said fingers cooperating to lift a bin upwardly through said top opening.

5. A carousel-type refuse compacting system a defined in claim 1 wherein said refuse compacting subassembly comprises:
   a reversible refuse compacting motor mounted on said stationary supporting structure above said rotary base plate;
   a pair of horizontally spaced, vertically extending shafts drivingly connected to said refuse compacting motor for vertical reciprocation up and down as said motor is bidirectionally rotated; and
   a horizontally extending compacting plate secured to the lower ends of said shafts.

6. A carousel-type refuse compacting system as defined in claim 5 and further characterized as including a compacting force plate mounted on said stationary supporting structure at a location immediately beneath said rotary base plate and vertically aligned with said compacting plate.

7. A carousel-type refuse compacting system as defined in claim 6 wherein said stationary supporting structure comprises:
   a housing having a top portion and a bottom portion, and further including side walls and a top wall having an opening therethrough;
   a hinged lid closing the opening in the top wall.

8. A carousel-type refuse compacting system as defined in claim 1 and further characterized as including means rotatably supporting said rotary base plate for rotation relative to said stationary supporting structure.

9. A carousel-type refuse compacting system as defined in claim 8 wherein said supporting means comprises:
   an annular bearing race;
   a stationary compacting force plate mounted on said stationary supporting structure at a location under a portion of said rotary base plate; and
   spherical bearing means resiliently supported on the upper surface of said force plate and bearing against the lower side of said rotary base plate.

10. A carousel-type refuse compacting system comprising:
    a housing having a top defining an opening;
    a rotary base plate extending in a substantially horizontal plane and mounted in the lower portion of said housing for rotation about a vertical axis;
    a plurality of contiguous refuse receiving bins removably mounted on said base plate, and rotatable therewith about said vertical axis;
    means for selectively and incrementally driving said base plate in increments of rotation about said vertical axis to bring said bins in sequence to certain preselected positions;
    a refuse compacting subassembly mounted in said housing at a location spaced vertically above said rotatable base plate in a position to compact refuse in one of the bins carried on said base plate;
    a filled bin elevating and extricating subassembly mounted over said base plate within said housing for elevating and extricating a filled bin from its position on said rotary base plate to a position in which at least a portion of the bin extends upwardly through said opening in the top of said housing; and
    means mounted in the lower portion of said housing for weighing any one of said bins and its refuse contents.

11. A carousel-type refuse compacting system as defined in claim 10 and further characterized as including a stationary compacting force plate mounted in said housing under said rotary base plate at a location in substantially vertical alignment with said refuse compacting subassembly.

12. A carousel-type refuse compacting system as defined in claim 10 wherein said means for selectively and incrementally driving said base plate in increments of rotation comprises:
    a reversible drive motor;
    a shaft connected to said motor and drivingly engaging said rotary base plate.

13. A carousel-type refuse compacting system as defined in claim 10 and further characterized as including a bin filling chute mounted within said housing immediately beneath the opening in the top of the housing.

14. A carousel-type refuse compacting system as defined in claim 10 wherein said means mounted in the lower portion of said housing for weighing comprises:
    at least one load cell at each location on said base plate upon which one of said bins is mounted and facing upwardly from the upper side of said base plate to be responsive to the total weight of the bin located thereabove.

15. A carousel-type refuse compacting system as defined in claim 10 wherein said refuse compacting subassembly comprises:
    a refuse compacting motor mounted in said housing;
    a threaded shaft driven in rectilinear movement by said motor; and
    a compacting plate connected to said shaft and sized and positioned to pass into any one of said bins at a time when said shaft is driven in rectilinear movement by said motor.

16. A carousel-type refuse compacting system as defined in claim 10 wherein said filled bin elevating and extricating subassembly comprises:
    a receptacle lifting motor supported in said housing; and
    means drivingly connected to said lifting motor and engageable with one of said bins upon energization of said lifting motor to lift said engaged bin upwardly within said housing.

17. A carousel-type refuse compacting system as defined in claim 16 wherein said means drivingly connected to said lifting motor comprises:
- a plurality of horizontally spaced, vertically extending endless chains drivingly connected to said bin motor for bidirectional movement during the raising and lowering of a filled bin as said motor is drivingly actuated for rotation in first one direction and then another;
- a lift finger carried on each of said endless chains, said fingers cooperating to lift a bin upwardly through said top opening.

18. A carousel-type refuse compacting system comprising:
- a stationary housing;
- a rotary base plate extending in a substantially horizontal plane, and mounted in the lower portion of said housing for rotation about a vertical axis;
- a plurality of refuse-receiving bins selectively removably mounted on said base plate, and rotatable therewith about said vertical axis;
- means for selectively and incrementally driving said base plate in increments of rotation to bring said bins to certain selected positions within said housing;
- a refuse-compacting subassembly mounted in said housing at a location spaced vertically over said rotatable base plate in a position to compact refuse in one of said bins carried on said base plate when said one bin is rotated to a specific position within said housing under said refuse-compacting subassembly;
- a filled bin elevating and extricating subassembly comprising:
  - a reversible bin lifting motor supported by said housing at a location above said rotary base plate;
  - a plurality of horizontally spaced, vertically extending endless chains drivingly connected to said bin motor for bidirectional movement during the raising and lowering of a filled bin a said bin lifting motor is drivingly actuated for rotation in first one direction and then another; and
  - a lift finger carried on each of said endless chains, said fingers cooperating to lift a bin upwardly toward the top of said housing as said reversible bin lifting motor is rotated in one direction.

19. A carousel-type refuse compacting system comprising:
- a stationary housing having a top portion and a lower portion, and further including side walls and a top wall having an opening therethrough;
- a rotary base plate mounted in the lower portion of the housing for rotation about a vertical axis extending upwardly in the center of the housing;
- multiple refuse-receiving bins selectively removably mounted on said base plate and rotatable therewith for rotation about said vertical axis;
- means for driving said base plate in rotation;
- means for automatically stopping the rotation of said base plate when one of said bins is in a selected position relative to said stationary housing;
- a refuse-compacting subassembly mounted in said stationary housing at a location spaced above said base plate in a position to compact refuse in one of said refuse-receiving bins carried on said base plate when said one bin is rotated to a specific position within said housing under said refuse-compacting subassembly, said refuse-compacting subassembly comprising:
  - a reversible refuse-compacting motor mounted on said stationary supporting structure above said rotary base plate; and
  - a pair of horizontally spaced, vertically extending shafts drivingly connected to said refuse-compacting motor for vertical reciprocation up and down as said motor is bi-directionally rotated; and
  - a horizontally extending compacting plate secured to the lower ends of said shafts and positioned and dimensioned for entry into said one bin;
- refuse-directing means disposed under the opening through the top wall of said housing for directing refuse downwardly from the opening toward the rotary base plate; and
- means for removing a filled refuse-receiving bin from said housing at a height within said housing which is higher than the location in said housing at which said rotary base plate is located.

20. A carousel-type refuse compacting system as defined in claim 19 and further characterized as including means for lifting a bin within said housing and elevating it to a location where at least the top portion of said lifted bin projects through the opening in the top of said housing for removal therefrom.

21. A carousel-type refuse compacting system as defined in claim 19 and further characterized as including a compacting force plate mounted within said housing at a location immediately below said rotary base plate and vertically aligned with said compacting plate forming a part of said refuse compacting subassembly.

* * * * *

UNITED STATES PATENT AND TRADEMARK OFFICE
CERTIFICATE OF CORRECTION

PATENT NO. : 5,259,304
DATED : Nov. 9, 1993
INVENTOR(S) : Mark A. Roberts

It is certified that error appears in the above-indentified patent and that said Letters Patent is hereby corrected as shown below:

Column 7, line 5, delete "an" and insert --any-- therefor;

Column 7, line 20, delete "secure)y" and substitute --securely-- therefor;

Column 7, line 56, after "is" (first occurrence), delete "o";

Column 11, line 5, delete "ca" and substitute --can-- therefor;

Column 14, line 63, delete "receptacle" and substitute --bins-- therefor; and

Column 15, line 44, after "bin" delete "a" and substitute --as-- therefor.

Signed and Sealed this

Twelfth Day of April, 1994

Attest:

BRUCE LEHMAN

Attesting Officer　　　Commissioner of Patents and Trademarks